Dec. 10, 1929.　　A. ROHRBACH　　1,738,670
AIRPLANE
Filed Sept. 19, 1927　　2 Sheets-Sheet 1

Inventor
Adolf Rohrbach
By Chas H Keel
atty

Dec. 10, 1929.  A. ROHRBACH  1,738,670
AIRPLANE
Filed Sept. 19, 1927   2 Sheets-Sheet 2
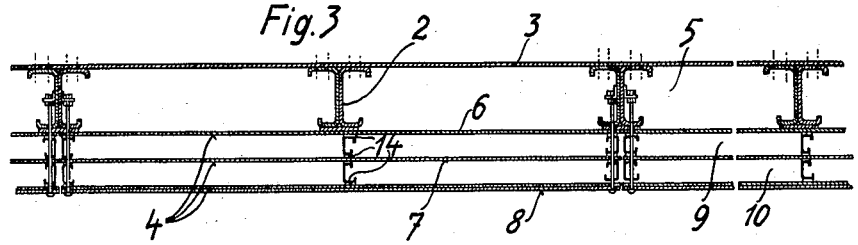
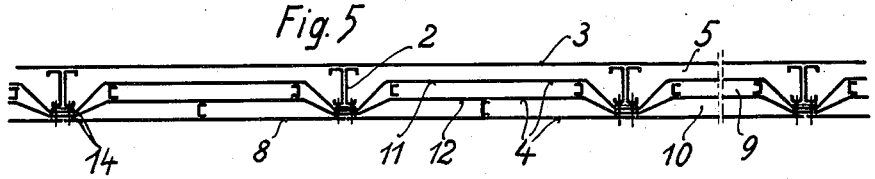
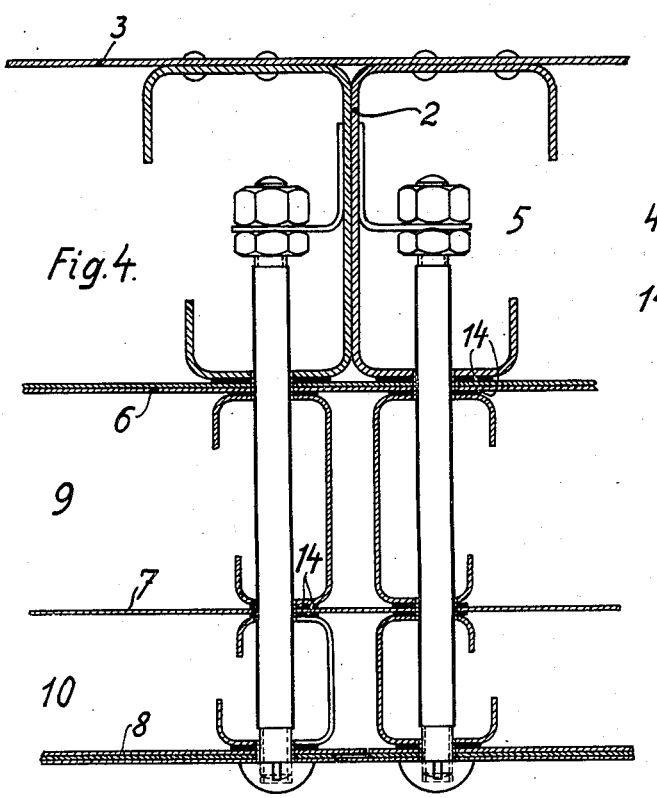
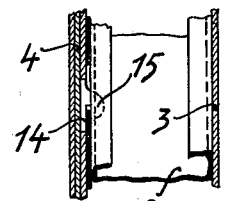
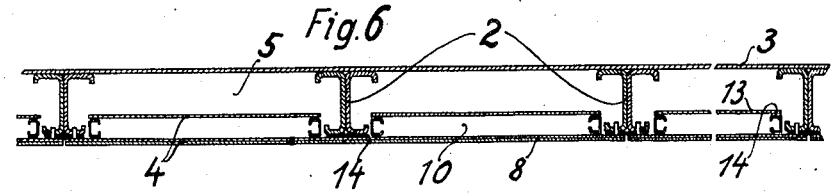

Patented Dec. 10, 1929

1,738,670

UNITED STATES PATENT OFFICE

ADOLF ROHRBACH, OF BERLIN-WILMERSDORF, GERMANY, ASSIGNOR TO ROHRBACH PATENTS CORPORATION, A CORPORATION OF DELAWARE

AIRPLANE

Application filed September 19, 1927, Serial No. 220,343, and in Germany September 29, 1926.

This invention relates to aircraft.

It is desirable to construct airplanes for passenger service so that the passenger cabins are maintained as free as possible from the noise of the screws and engines. Especially pronounced is the transmittance of sound in metal airplanes whose thin skin transmits the transferred oscillations which are damped only in a small degree by the rib frames. The conditions are a little better in wooden airplanes the fuselage walls of which consist of wooden wedges which are less elastic than the metal skin and do not conduct the sound so much. Still better are the conditions in wooden airplanes the fuselage walls of which are formed by a hollow body consisting of the frame structure with the inner and outer wooden boards fastened to it. It is, therefore, the advantage of this fuselage construction chosen for reasons of strength that a sound-damping air-bed is formed between the exterior and interior walls of the fuselage.

For metal airplanes double metal walls are not necessary. The skin connected to the frame of the fuselage is covered on the side of the passenger cabin with tightened cloth which, of course, has no substantial influence upon the sound damping. If it is desired to keep the noise from the passenger cabin, the latter is lined with paddings. But even by applying such paddings the sound will be damped only to a slight degree unless the padding is very thick which makes it expensive and especially very heavy.

In order to avoid this excess of weight and to obtain a more satisfactory and more nearly sound-proof cabin I have devised a construction substantially as follows. For one wall of the side and top casing I employ the material employed in the usual way for the structure of the fuselage, e. g., metal skin with metal airplanes; this exterior wall is stressed and transmits the forces. For the other wall, however, I employ a laminated material which for reasons of sound-damping has a lower elasticity or density, such as asbestos, wood, cellulose, rubberoid and the like, such an interior sound-damping wall will not cause the oscillations of resonance which would be present especially in metal airplanes if the inner side of the fuselage would be also a metal skin similar to the above mentioned wooden construction. The interior wall to be provided according to the invention cannot be considered as a stressed part. Therefore, the inner wall need not be very strong and covers preferably the projecting parts of the hull frame so that the walls of the passenger cabin offer large and smooth surfaces. It is a matter of course that they are strong enough to resist ordinary wear and tear thereupon, such for example as pressures exerted thereupon by the passenger.

For metal aircraft, especially for hydroairplanes, it is very important that all parts of the structure and their connections can be constantly inspected. In order to be able to inspect easily the ribs surrounded by the hollow walls and other parts of the supporting frame, the junctions, the inner side of the stressed outer skin and the like, I propose furthermore to divide the inner wall turned towards the passenger cabin into single, easily detachable parts so that all parts of the supporting frame can be inspected without taking away the whole inner walls.

The damping of the sound can be also still further improved if the inner wall is also designed as a hollow body. It is a further improvement in making the inner wall consist of a number of single hollow walls. In this event two or several air beds lying one after the other will result thus keeping the noise from the passenger cabin to an efficient and substantial degree.

The drawing shows several modifications of the invention.

Figures 3, 5 and 6 show other forms of hollow walls embodying the invention.

Figures 4 and 7 represent details on an enlarged scale.

Figure 1:
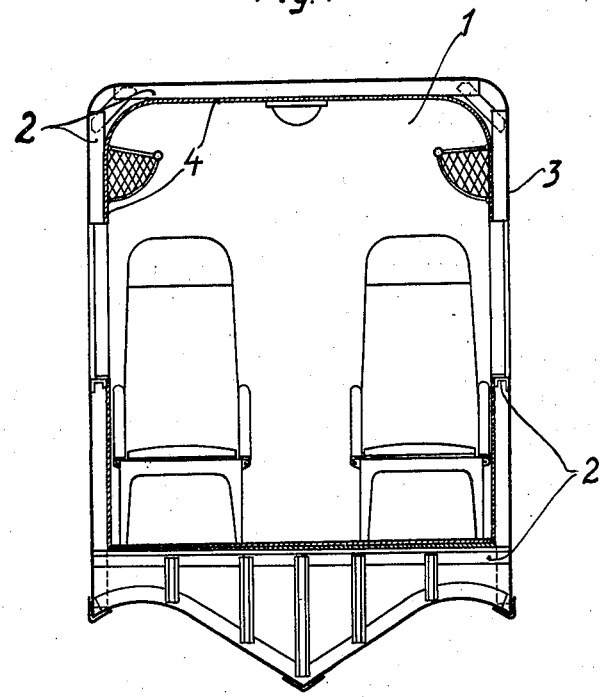
Fig. 1 shows a vertical section through the fuselage of a metal flying boat.
Figure 2:
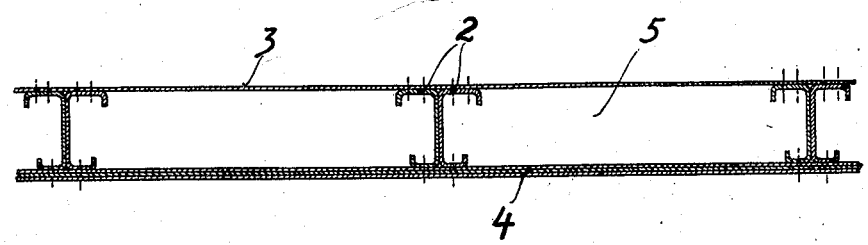
Fig. 2 shows in amplification a section through the side wall or the ceiling of the fuselage.

The fuselage 1 of a metal flying boat consists usually of a frame structure 2 embraced outside by a metal skin sharing the reception of forces. On the inner side of the side and top ribs is a wall 4 consisting of a laminated body of one or several parts being made of a material which preferably has an essentially lower elasticity or density than metal, such as asbestos, cellulose, wooden bars, and the like or a composition of these materials. The wall 4 does not serve as a part of the structure in the sense of the transmission of forces, but it serves in the main solely for sound-damping being at the same time a pleasing lining of the frame structure. On account of the properties of its material the inner wall conducts the sound more poorly than the metal outer skin whose oscillations after being conducted through the sound-damping air bed 5, cannot produce similar oscillations of the inner wall. The advantage of the disturbed sound transmittance is also demonstrated if the ribs are fully covered by the inner wall 4 according to Fig. 2. If desired the hollow space 5 between the walls can be filled up with sound-damping materials such as kapok and the like.

In Fig. 3 "2" is the supporting frame consisting of longitudinal and transversal ribs of the fuselage or cabin or of another compartment lined against sound-transmittance of an airplane and, "3" the metal outer skin being rigidly connected to the supporting frame by means of rivets or the like. The interior wall "4" is divided into single small parts which are easily detachable. Their size will usually depend on the location of the ribs and other important structural parts. The drawings show by way of example these single parts which are partly supported by two adjacent ribs, partly by the first and the third rib each. By taking away a portion of the wall it is possible to inspect the structural parts in the hollow space 5 as well as to make repairs and to replace the protecting paint.

An improvement of the invention is that the inner wall 4 itself is designed as a hollow body. According to Fig. 3 the wall 4 consists of 3 parallel walls 6, 7, 8 forming the hollow spaces 9, 10. The manner in which the interior wall is divided into single parts and the construction of the inner wall in the form of a number of single hollow walls can be seen from Fig. 3.

According to Figure 5 the interior wall 4 which is in the form of a hollow body consists of the wall side 8 and the walls 11 and 12 forming the hollow spaces 9, 10 and projecting into the hollow space 5 bordered by the ribs 2. According to Fig. 5 the ends of walls 11, 12 which are braced against the wall 8 are turned or inclined toward the inside wall 8 and run back to the inner surfaces or junctions of the ribs with the innermost skins. According to Fig. 6 the wall 13 supported by the innermost wall 8 is not connected to the ribs 2 except indirectly through the wall 8.

The innermost wall 8 should be so strong that it may not be damaged by being pushed by the passengers and capable of withstanding ordinary usage in aircraft cabin constructions. Wall 8 is, therefore, stronger than the walls 6, 7, 11, 12, 13 which serve solely for breaking the sound-waves and may consist of a material being substantially weaker, such as rubberoid, asbestos and similar materials which have good sound-damping properties. Eventually stiffened cloth may be employed.

A further effective means for sound-damping is the insertion of layers 14 consisting of felt, asbestos, rubber and the like between the supporting frame 2 and the wall 4 forming the hollow space 5 or between the structural parts 6, 7, 8, 11, 12, 13 of the latter.

As to the choice of the intermediate layers it is important that with regard to elasticity and density they do not differ from the neighbouring parts such as walls and ribs.

Fig. 6 shows a screw connection for the inner wall 4. Fig. 7 represents a bolt connection consisting of a bolt 15 which is fastened to the wall 4 and is conducted through an opening of the flange of a rib.

Claims:

1. A passenger aircraft fuselage comprising a room at least in part surrounded by a double wall, a fuselage frame structure between the said two walls, one wall consisting of the constructive material of the aeroplane body and serving as a member for transmitting the forces in the craft, the other wall consisting of a material of a different elasticity or density from that of the former and adapted to serve as a sound-absorbing or damping material, said second wall being firmly connected to the supporting frame of the craft but spaced from the first named wall to provide a sound absorbing or damping air chamber therebetween.

2. An aircraft fuselage containing a room for the accommodation of passengers, said room being under atmospheric pressure and surrounded by hollow walls, a fuselage frame structure between said two walls, the space between the walls being a sound absorbing air chamber under atmospheric pressure, one wall consisting of the material employed for the construction of the cabin and serving as a strength member, the other wall being made of a material with another elasticity or density from that of the first named wall and serving solely for sound-absorbing or damping purposes.

3. An aircraft fuselage of the character set forth in claim 2 wherein the constructive material of the craft is metal and one wall of the hollow wall is a metal skin serving as a force-transmitting member.

4. An aircraft fuselage of the character set forth in claim 2, one wall of the hollow wall being a metal skin and the other wall including wood or wood-like boards.

5. An aircraft fuselage containing a room at least a part of which is surrounded by a double wall, one wall consisting of the material of the airplane body and serving as a strength member in the airplane, the other wall consisting of a material having an elasticity and density different from that of the first named wall and adapted as a sound-absorbing or damping material, said second wall being firmly joined to the supporting frame of the airplane, but spaced from the first named wall to form an air chamber therebetween, said second named wall itself being hollow.

6. An aircraft fuselage of the character set forth in claim 5 wherein the second named wall embodies at least two hollow spaces in a direction at right angles thereto.

7. An aircraft fuselage of the character set forth in claim 5 wherein the frame of the aircraft body is arranged between the double walls, the hollow spaces of the sound-absorbing wall being located substantially within the confines of the body frame.

8. An aircraft fuselage of the character set forth in claim 1 wherein the sound-absorbing wall includes a sound-absorbing means interposed in its points of connection with the frame.

9. An aircraft fuselage of the character set forth in claim 1 wherein both walls of the double wall are firmly secured to the opposite sides of the frame, with a sound-absorbing intermediate layer being interposed at the connection between the sound-absorbing wall and the supporting frame, said intermediate layer prohibiting the direct contact between the frame and the wall.

10. In an aircraft fuselage, an all metal frame construction including a flat metallic skin surrounding said metallic frame and firmly secured thereto to serve as a strength giving wall therefor, a second wall consisting of a sound-absorbing or damping material which is firmly secured to the inner side of the frame work but spaced from the metallic skin to form a sound-absorbing air chamber therebetween, said outer metallic frame and said inner sound-absorbing or deadening material cooperatively functioning together and with the air chamber to provide a substantially sound-proof passenger cabin notwithstanding the all metallic construction of the frame.

11. A fuselage of the character set forth in claim 10 wherein the inner and sound-absorbing wall is formed into readily attachable and detachable panels with means for readily attaching and detaching the same.

12. A fuselage of the character set forth in claim 10 wherein the inner and sound-absorbing wall is itself double walled with air chambers contained therein.

13. A fuselage of the character set forth in claim 10 wherein the inner and sound-absorbing wall is itself double walled with air chambers contained therein and projects into the space within the fuselage frame.

14. A fuselage of the character set forth in claim 10 wherein the inner and sound-absorbing wall is formed into readily attachable and detachable panels with means for readily attaching and detaching the same, the panels when assembled forming a continuous inner wall with an even surface.

15. An aircraft fuselage comprising a room at least in part surrounded by a double wall, one wall consisting of the constructive material of the airplane body and serving as a member for transmitting the forces in the craft, the other wall consisting of a material of a different elasticity or density from that of the former and adapted to serve as a sound-absorbing or damping material, said second wall being firmly connected to the supporting frame of the craft but spaced from the first named wall to provide an air chamber therebetween, the inner wall of the double wall being divided into a number of panels, said panels being easily detachable, a fuselage frame structure being disposed between the two walls so that the former will be exposed upon removal of the panels.

16. An aircraft fuselage comprising a room at least in part surrounded by a double wall, one wall consisting of the constructive material of the airplane body and serving as a member for transmitting the forces in the craft, the other wall consisting of a material of a different elasticity or density from that of the former and adapted to serve as a sound-absorbing or damping material, said second wall being firmly connected to the supporting frame of the craft but spaced from the first named wall to provide an air chamber therebetween, the sound-absorbing wall being divided into a number of individual readily attachable and detachable panels, bulkhead frames of the fuselage disposed between the two walls, the detachable panels being firmly connected to the fuselage frame and the connection consisting of hooks and eyes, a hook being arranged at one part to be connected and the eye being disposed at the other part to be connected.

17. A passenger aircraft fuselage comprising a frame structure defining a passenger compartment, an outer wall secured to the frame structure, an inner wall spaced from the outer wall and firmly secured to the inner part of the frame work about said compartment, the inner wall consisting of a material of a different elasticity or density from that of the outer wall and adapted to serve as a sound absorbing or damping material and forming with the outer wall a sound absorbing or damping air chamber cooperatively functioning therewith.

In testimony whereof, I have signed my name to this specification.

ADOLF ROHRBACH.